United States Patent
Shih et al.

(10) Patent No.: US 11,960,116 B2
(45) Date of Patent: Apr. 16, 2024

(54) OPTICAL WAVEGUIDE COUPLER

(71) Applicant: Taiwan Semiconductor Manufacturing Company, Ltd., Hsinchu (TW)

(72) Inventors: Chih-Tsung Shih, Hsinchu (TW); Chewn-Pu Jou, Hsinchu (TW); Felix Ying-Kit Tsui, Cupertino, CA (US); Stefan Rusu, Sunnyvale, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 509 days.

(21) Appl. No.: 17/080,844

(22) Filed: Oct. 27, 2020

(65) Prior Publication Data
US 2022/0128763 A1 Apr. 28, 2022

(51) Int. Cl.
G02B 6/12 (2006.01)
G02B 6/122 (2006.01)
G02B 6/125 (2006.01)
G02B 6/26 (2006.01)
G02B 6/42 (2006.01)

(52) U.S. Cl.
CPC ........... *G02B 6/1228* (2013.01); *G02B 6/125* (2013.01)

(58) Field of Classification Search
CPC ........ G02B 6/1228; G02B 6/125; G02B 6/14; G02B 6/24; G02B 6/12016; G02B 6/42
USPC .......... 385/14, 27–28, 30–31, 39–43, 48–50, 385/129–132
See application file for complete search history.

(56) References Cited

U.S. PATENT DOCUMENTS

| | | | | |
|---|---|---|---|---|
| 4,389,567 A | * | 6/1983 | Khoe | G02B 6/125 250/227.24 |
| 8,615,148 B2 | * | 12/2013 | Chen | G02B 6/1228 385/43 |
| 9,746,607 B2 | * | 8/2017 | Collins | G02B 6/1228 |
| 2002/0031296 A1 | * | 3/2002 | Lee | B82Y 20/00 385/28 |
| 2008/0226224 A1 | * | 9/2008 | Blauvelt | G02B 6/42 385/14 |
| 2011/0116741 A1 | * | 5/2011 | Cevini | G02B 6/305 385/28 |
| 2019/0146153 A1 | * | 5/2019 | Park | G02B 6/1228 385/43 |
| 2021/0382233 A1 | * | 12/2021 | Baba | G02B 6/126 |

* cited by examiner

*Primary Examiner* — Kaveh C Kianni
*Assistant Examiner* — Hung Q Lam
(74) *Attorney, Agent, or Firm* — JCIPRNET

(57) ABSTRACT

A structure includes a first waveguide and a second waveguide. The first waveguide includes a first strip portion and a first tapered tip portion connected to the first strip portion. The second waveguide includes a second strip portion and a second tapered tip portion connected to the second strip portion, wherein the first tapered tip portion of the first waveguide is optically coupled to the second tapered tip portion of the second waveguide, and the first waveguide and the second waveguide are configured to guide a light. In a region where the light is coupled between the first tapered tip portion and the second tapered tip portion, an effective refractive index of the first waveguide with respect to the light is substantially equal to an effective refractive index of the second waveguide with respect to the light.

20 Claims, 10 Drawing Sheets

OPTICAL WAVEGUIDE COUPLER

BACKGROUND

Optical signals are usable for high speed and secure data transmission between two devices. In some applications, a device capable of optical data transmission includes at least an integrated circuit (IC or "chip") having a laser die for transmitting and/or receiving optical signals. Also, the device usually has one or more other optical or electrical components, waveguides for the transmission of the optical signals, and a support, such as a substrate of a printed circuit board, on which the chip equipped with the laser die and the one or more other components are mounted. The performance of photonic or optical components may be affected due to optical loss during the transmission of the optical signals between different waveguides.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
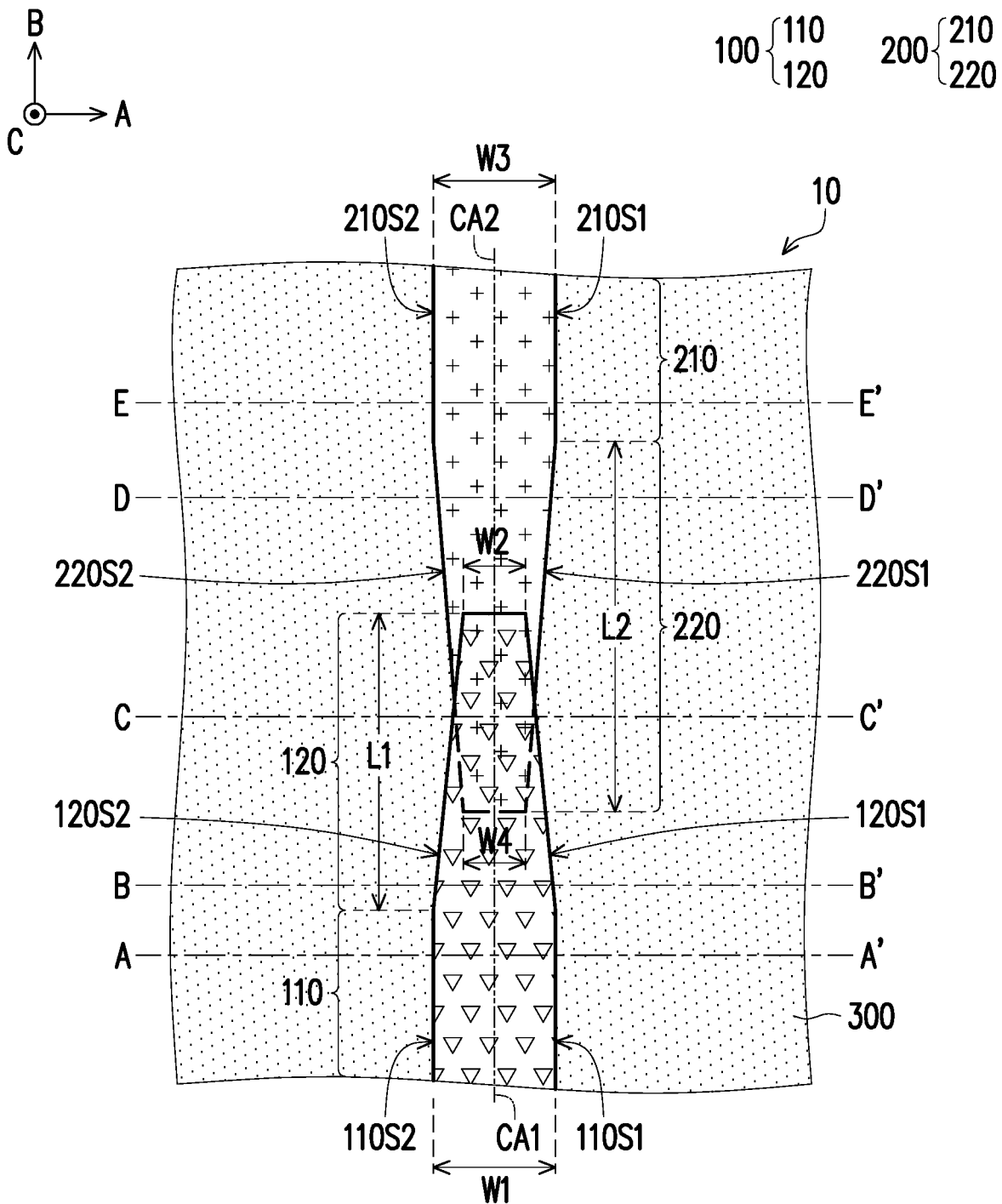
FIG. 1A schematically illustrates a top view of an optical waveguide coupler in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Integrated optical waveguides are often used in photonic integrated circuits. Generally, an integrated optical waveguide consist of an optical medium having a higher dielectric constant (i.e., a core layer), which is surrounded by a medium having a lower dielectric constant (i.e., a cladding layer). Light is guided along a length of the waveguide by way of total internal reflection due to the difference in dielectric constants between the optical medium (i.e., a core layer) and the surrounding medium (i.e., a cladding layer). The photonic integrated circuits use the optical waveguides to transmit and/or receive optical signals from different devices. The optical waveguides from different devices are coupled together to allow optical communication between the optical circuits.

Figure 1B:
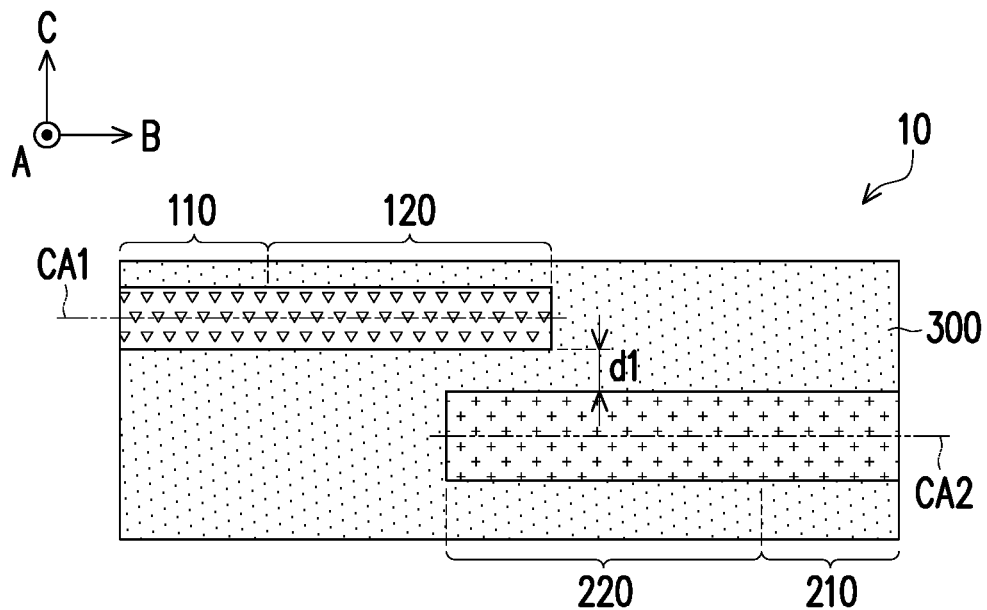
FIGS. 1B and 1C schematically illustrate side views of the optical waveguide coupler of FIG. 1A in accordance with some embodiments.
Figure 1C:
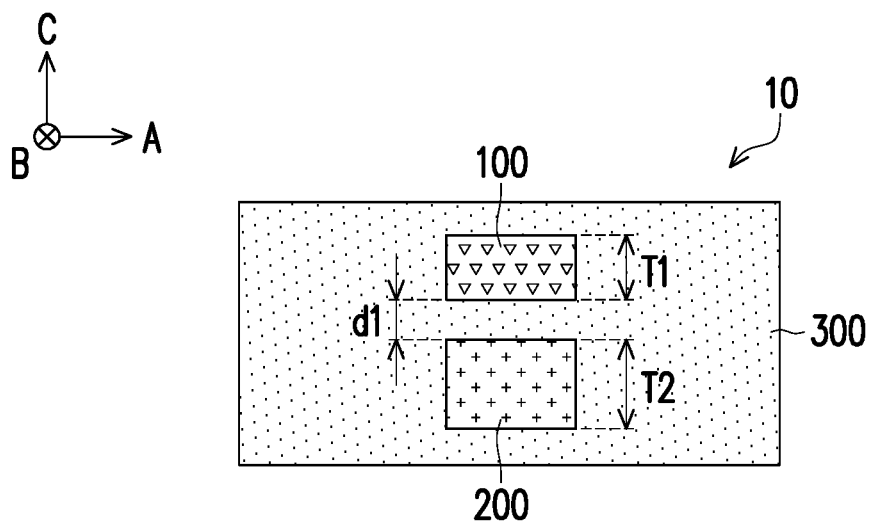

FIG. 1A schematically illustrates a top view of an optical waveguide coupler in accordance with some embodiments. FIGS. 1B and 1C schematically illustrate side views of the optical waveguide coupler of FIG. 1A in accordance with some embodiments. A 3D coordinate axis having mutually orthogonal A, B and C axes are provided for ease of description.

Referring to FIGS. 1A, 1B and 1C, an optical waveguide coupler 10 including a first waveguide 100 and a second waveguide 200 is shown. In particular, FIG. 1B shows the side view of the optical waveguide coupler 10 from A-direction and FIG. 1C shows the side view of the optical waveguide coupler 10 from B-direction. In some embodiments, the first waveguide 100 and the second waveguide 200 are optically coupled to each other, and are configured to guide a light (e.g., the light 50 illustrated in FIGS. 2A-2F) from a first point to a second point over a substrate (e.g., the substrate 410 illustrated in FIG. 6). In some embodiments, the first waveguide 100 and the second waveguide 200 are single-mode waveguides. In some embodiments, the light is coupled from the first waveguide 100 to the second waveguide 200. In some alternative embodiments, the light is coupled from the second waveguide 200 to the first waveguide 100. In some embodiments, the first waveguide 100 and the second waveguide 200 are made of different materials, and thus a refractive index of the first waveguide 100 may be different from that of the second waveguide 200. In some alternative embodiments, the first waveguide 100 and the second waveguide 200 are made of a same material, and thus a refractive index of the first waveguide 100 may be substantially equal to that of the second waveguide 200. For example, the material of the first waveguide 100 and/or the second waveguide 200 may be silicon, silicon nitride ($SiN_x$, where x>0), silicon oxynitirde ($SiO_xN_y$, where x>0 and y>0), silicon carbide ($Si_xC_y$, where x>0 and y>0), or other suitable material. In some embodiments, the first waveguide 100 and the second waveguide 200 are embedded in a dielectric layer 300 having a refractive index lower than those of the first waveguide 100 and the second waveguide 200. For example, the material of the dielectric layer 300 may be silicon oxide ($SiO_x$, where x>0), or other suitable material.

In some embodiments, the first waveguide 100 has a constant thickness T1, and the second waveguide 200 has a constant thickness T2, as shown in FIG. 1C. In some embodiments, the thickness T1 of the first waveguide 100 may be different from the thickness T2 of the second waveguide 200. In some alternative embodiments, the thickness of the first waveguide 100 may be substantially equal to the thickness of the second waveguide 200.

In some embodiments, the first waveguide 100 includes a first strip portion 110 and a first tapered tip portion 120 connected to the first strip portion 110. In some embodiments, the first tapered tip portion 120 has a first end and a second end opposite to the first end of the first tapered tip portion 120, wherein the first end of the first tapered tip portion 120 is connected to the first strip portion 110, and the second end of the first tapered tip portion 120 is farther away from the first strip portion 110. In some embodiments, the first strip portion 110 has a constant width (i.e., the width W1). In some embodiments, the first end of the first tapered tip portion 120 and the first strip portion 110 have the same width (i.e., the width W1). In some embodiments, a width (i.e., the width W2) of the second end of the first tapered tip portion 120 is less than a width (i.e., the width W1) of the first end of the first tapered tip portion 120. In some embodiments, the width (i.e., the width W2) of the second end of the first tapered tip portion 120 is a minimum width of the first tapered tip portion 120. In some embodiments, the first tapered tip portion 120 from the top view is shaped as an isosceles trapezoid. In other words, the first tapered tip portion 120 from the top view is symmetrical relative to a central axis CA1 of the first waveguide 100. It is noted that the first strip portion 110 is the main portion of the first waveguide 100, so the central axis CA1 of the first waveguide 100 refers to the central axis CA1 of the first strip portion 110. Since the first tapered tip portion 120 is symmetrical relative to a central axis CA1 of the first waveguide 100, the first strip portion 110 and the first tapered tip portion 120 are coaxial.

In some embodiments, the first strip portion 110 has a first sidewall 110S1 and a second sidewall 110S2 opposite to the first sidewall 110S1, and the first tapered tip portion 120 has a first sidewall 120S1 and a second sidewall 120S2 opposite to the first sidewall 120S1, wherein the first sidewall 110S1 of the first strip portion 110 is connected to the first sidewall 120S1 of the first tapered tip portion 120, and the second sidewall 110S2 of the first strip portion 110 is connected to the second sidewall 120S2 of the first tapered tip portion 120. In some embodiments, the first sidewall 110S1 and the second sidewall 110S2 of the first strip portion 110 are parallel to the central axis CA1 of the first waveguide 100, and the first sidewall 120S1 and the second sidewall 120S2 of the first tapered tip portion 120 are inclined with respect to the central axis CA1 of the first waveguide 100. In some embodiments, the first sidewall 110S1 and the second sidewall 110S2 of the first strip portion 110 as well as the first sidewall 120S1 and the second sidewall 120S2 of the first tapered tip portion 120 are respectively vertical sidewalls (i.e., sidewalls perpendicular to top surface and/or bottom surface of the first waveguide 100).

In some embodiments, the second waveguide 200 includes a second strip portion 210 and a second tapered tip portion 220 connected to the second strip portion 210. In some embodiments, the second tapered tip portion 220 has a first end and a second end opposite to the first end of the second tapered tip portion 220, wherein the first end of the second tapered tip portion 220 is connected to the second strip portion 210, and the second end of the second tapered tip portion 220 is farther away from the second strip portion 210. In some embodiments, the second strip portion 210 has a constant width (i.e., the width W3) which may be substantially equal to or different from the width (i.e., the width W1) of the first strip portion 110. In some embodiments, the first end of the second tapered tip portion 220 and the second strip portion 210 have the same width (i.e., the width W3). In some embodiments, a width (i.e., the width W4) of the second end of the second tapered tip portion 220 is less than a width (i.e., the width W3) of the first end of the second tapered tip portion 220. In some embodiments, the width (i.e., the width W4) of the second end of the second tapered tip portion 220 is a minimum width of the second tapered tip portion 220. In some embodiments, the second tapered tip portion 220 from the top view is shaped as an isosceles trapezoid. In other words, the second tapered tip portion 220 from the top view is symmetrical relative to a central axis CA2 of the second waveguide 200. It is noted that the second strip portion 210 is the main portion of the second waveguide 200, so the central axis CA2 of the second waveguide 200 refers to the central axis CA2 of the second strip portion 210. Since the second tapered tip portion 220 is symmetrical relative to a central axis CA2 of the second waveguide 200, the second strip portion 210 and the second tapered tip portion 220 are coaxial.

In some embodiments, the second strip portion 210 has a first sidewall 210S1 and a second sidewall 210S2 opposite to the first sidewall 210S1, and the second tapered tip portion 220 has a first sidewall 220S1 and a second sidewall 220S2 opposite to the first sidewall 220S1, wherein the first sidewall 210S1 of the second strip portion 210 is connected to the first sidewall 220S1 of the second tapered tip portion 220, and the second sidewall 210S2 of the second strip portion 210 is connected to the second sidewall 220S2 of the second tapered tip portion 220. In some embodiments, the first sidewall 210S1 and the second sidewall 210S2 of the second strip portion 210 are parallel to the central axis CA2 of the second waveguide 200, and the first sidewall 220S1 and the second sidewall 220S2 of the second tapered tip portion 220 are inclined with respect to the central axis CA2 of the second waveguide 200. In some embodiments, the first sidewall 210S1 and the second sidewall 210S2 of the second strip portion 210 as well as the first sidewall 220S1 and the second sidewall 220S2 of the second tapered tip portion 220 are respectively vertical sidewalls (i.e., sidewalls perpendicular to top surface and/or bottom surface of the second waveguide 200).

In some embodiments, both the first waveguide 100 and the second waveguide 200 extend along the B-direction. In other words, the central axis CA1 of the first waveguide 100 is parallel to the central axis CA2 of the second waveguide 200. In some embodiments, the central axis CA1 of the first waveguide 100 is offset from the central axis CA2 of the second waveguide 200 in the C-direction, as shown in FIG. 1B. In some embodiments, the first waveguide 100 and the second waveguide 200 are disposed at different level heights, as shown in FIGS. 1B and 1C. In some embodiments, the first tapered tip portion 120 of the first waveguide 100 is disposed over the second tapered tip portion 220 of the second waveguide 200 in the C-direction. However, in some alternative embodiments, the second tapered tip portion 220 of the second waveguide 200 may be disposed over the first tapered tip portion 120 of the first waveguide 100. In some embodiments, the first tapered tip portion 120 of the first waveguide 100 from the top view partially overlaps with the second tapered tip portion 220 of the second waveguide 200, as shown in FIG. 1A. In other words, a projection of the first tapered tip portion 120 along the C-direction partially overlaps with the second tapered tip portion 220. In some embodiments, the first tapered tip portion 120 of the first waveguide 100 from the side view is spaced apart from the second tapered tip portion 220 of the second waveguide 200 by a distance d1, as shown in FIGS. 1B and 1C. In some embodiments, the distance d1 between the first tapered tip portion 120 of the first waveguide 100 and the second tapered tip portion 220 of the second waveguide 200 may be in a range from about 10 nm to about 500 nm, or in a range from about 50 nm to about 200 nm. In some embodiments, the first strip portion 110 of the first waveguide 100 from the top view does not overlap with the second strip portion 210 of the second waveguide 200, as shown in FIG. 1A. In other words, a projection of the first strip portion 110 along the C-direction does not overlap with and is separated from the second strip portion 210.

In some embodiments, in order to reduce optical loss between the first waveguide 100 and the second waveguide 200, the design of the first waveguide 100 and the second waveguide 200 may satisfy the condition that an effective refractive index of the first waveguide 100 with respect to the light matches (e.g., is substantially equal to) an effective refractive index of the second waveguide 200 with respect to the light in a region (or so-called "coupling region") where the light is coupled between the first tapered tip portion 120 and the second tapered tip portion 220. In this way, reflections or scattering of light in the coupling region are minimized. Some detailed descriptions are described in accompany with the following FIG. 2A through FIG. 2F.

Figure 2A:
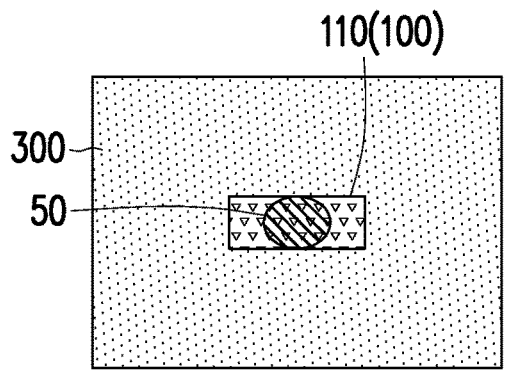
FIGS. 2A, 2B and 2C schematically illustrate various cross-sectional views of a first waveguide of FIG. 1A in accordance with some embodiments, where the cross-sectional views of the first waveguide of the FIGS. 2A, 2B and 2C are taken along A-A', B-B', and C-C' lines shown in FIG. 1A, respectively.
Figure 2B:
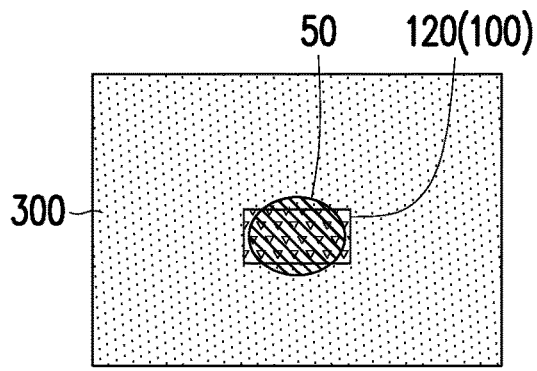
Figure 2C:
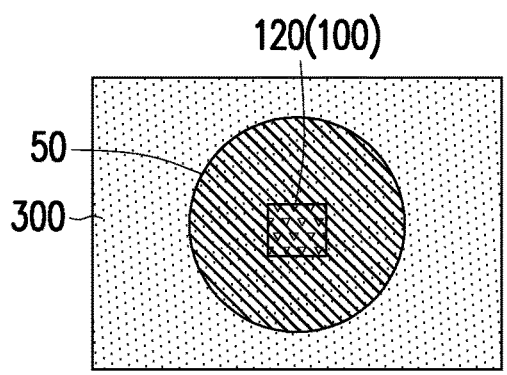
Figure 2D:
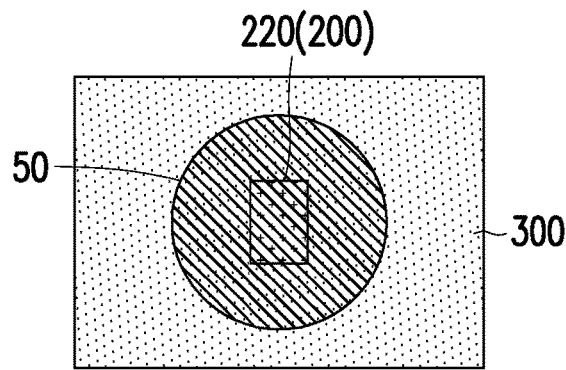
FIGS. 2D, 2E and 2F schematically illustrate various cross-sectional views of a second waveguide of FIG. 1A in accordance with some embodiments, where the cross-sectional views of the second waveguide of the FIGS. 2D, 2E and 2F are taken along C-C', D-D' and E-E' lines shown in FIG. 1A, respectively.
Figure 2E:
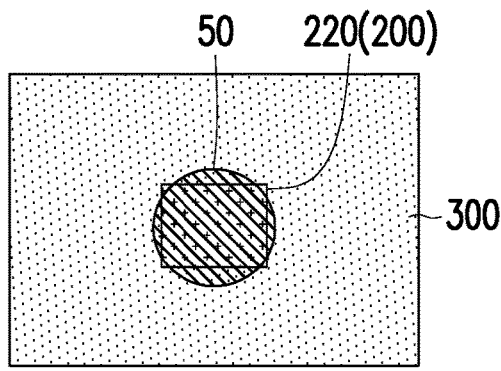
Figure 2F:
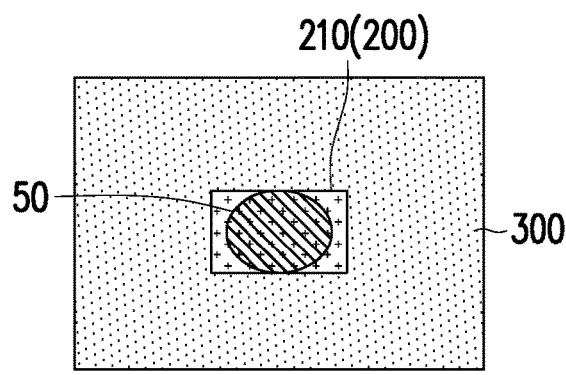

FIGS. 2A, 2B and 2C schematically illustrate various cross-sectional views of a first waveguide of FIG. 1A in accordance with some embodiments, where the cross-sectional views of the first waveguide of the FIGS. 2A, 2B and 2C are taken along A-A', B-B', and C-C' lines shown in FIG. 1A, respectively. FIGS. 2D, 2E and 2F schematically illustrate various cross-sectional views of a second waveguide of FIG. 1A in accordance with some embodiments, where the cross-sectional views of the second waveguide of the FIGS. 2D, 2E and 2F are taken along C-C', D-D' and E-E' lines shown in FIG. 1A, respectively. For illustration purpose, the light (or so-called "mode") 50 delivered by the optical waveguide coupler 10 is illustrated in FIG. 2A through FIG. 2F.

Referring to FIG. 2A through FIG. 2F, for ease of description, the light 50 is described as delivered from the first waveguide 100 to the second waveguide 200 as an example. In other words, the light 50 propagates from the first strip portion 110 to the first tapered tip portion 120, from the first tapered tip portion 120 to the second tapered tip portion 220, and from the second tapered tip portion 220 to the second strip portion 210 in sequence. However, in other embodiments, the light 50 is delivered from the second waveguide 200 to the first waveguide 100. In such case, the light 50 propagates from the second strip portion 210 to the second tapered tip portion 220, from the second tapered tip portion 220 to the first tapered tip portion 120, and from the first tapered tip portion 120 to the first strip portion 110 in sequence.

As shown in FIG. 1A and FIG. 2A, when the light 50 propagates along the first strip portion 110 of the first waveguide 100, the light 50 is well confined within the first strip portion 110 of the first waveguide 100.

As shown in FIG. 1A and FIG. 2B, when the light 50 travels from the first strip portion 110 into the first tapered tip portion 120, the light 50 may not be confined properly within the first waveguide 100 due to the reduced width of the first tapered tip portion 120. Therefore, the mode 50 is distributed in a larger area around the first tapered tip portion 120, which contributes to an enlarged mode size.

As shown in FIG. 1A, FIG. 2B and FIG. 2C, as the mode 50 propagates from the first end of the first tapered tip portion 120 (which is connected to the first strip portion 110) to the second end of the first tapered tip portion 120 (which is farther away from the first strip portion 110), the mode 50 experiences decreasing amount of the core material, and the fraction of the mode field distribution that exists outside the core material increases, such that the effective refractive index of the first waveguide 100 that the mode 50 experiences is effectively decreased from the first end of the first tapered tip portion 120 to the second end of the first tapered tip portion 120. In addition, due to the reduction of the effective refractive index, the mode size of the mode 50 propagating in the first tapered tip portion 120 increases from the first end of the first tapered tip portion 120 to the second end of the first tapered tip portion 120. In other words, the effective refractive index of the first waveguide 100 with respect to the light 50 in a region close to the cross-section taken along the B-B' line is greater than the effective refractive index of the first waveguide 100 with respect to the light 50 in a region close to the cross-section taken along the C-C' line, and the mode size of the mode 50 in the cross-section taken along the B-B' line is smaller than the mode size of the mode 50 in the cross-section taken along the C-C' line.

As shown in FIG. 1A, FIG. 2C and FIG. 2D, in the coupling region where the light 50 is coupled between the first tapered tip portion 120 and the second tapered tip portion 220, the effective refractive index of the first waveguide 100 with respect to the light 50 is substantially equal to the effective refractive index of the second waveguide 200 with respect to the light 50, such that mode coupling can be achieved between the first waveguide 100 and the second waveguide 200 without high loss. In some embodiments, the coupling region is located between the first tapered tip portion 120 and the second tapered tip portion 220.

As shown in FIG. 1A, FIG. 2D and FIG. 2E, as the mode 50 propagates from the second end of the second tapered tip portion 220 (which is farther away from the second strip portion 210) to the first end of the second tapered tip portion 220 (which is connected to the second strip portion 210), the mode 50 experiences increasing amount of the core material, and the fraction of the mode field distribution that exists outside the core material decreases, such that the effective refractive index of the second waveguide 100 that the mode 50 experiences is effectively increased from the second end of the second tapered tip portion 220 to the first end of the second tapered tip portion 220. In addition, due to the increase of the effective refractive index, the mode size of the mode 50 propagating in the second tapered tip portion 220 decreases from the second end of the second tapered tip portion 220 to the first end of the second tapered tip portion 220. In other words, the effective refractive index of the second waveguide 200 in a region close to the cross-section taken along the C-C' line is less than the effective refractive index of the second waveguide 200 in a region close to the cross-section taken along the D-D' line, and the mode size of the mode 50 in the cross-section taken along the C-C' line is greater than the mode size of the mode 50 in the cross-section taken along the D-D' line.

As shown in FIG. 1A and FIG. 2F, when the light 50 travels from the second tapered tip portion 220 into the second strip portion 210 and propagates along the second strip portion 210 of the second waveguide 200, the light 50 is well confined within the second strip portion 210 of the second waveguide 200.

By gradually changing the effective refractive indices of the first waveguide 100 and the second waveguide 200 with respect to the light 50, the mode coupling can be achieved with high efficiency (i.e., low loss) when the effective refractive index of the first waveguide 100 with respect to the light 50 is substantially equal to the effective refractive index of the second waveguide 200 with respect to the light 50 in the region where the light 50 is coupled between the first tapered tip portion 120 and the second tapered tip portion 220. For example, the coupling loss less than 0.5 dB may be achieved in accordance with some embodiments of the present disclosure.

The "effective refractive index" herein has the analogous meaning for light propagation in a waveguide with restricted transverse extension, and the "effective refractive index" satisfies the following formula: $\beta = n_{eff} * 2\pi/\lambda$, where $n_{eff}$ is the effective refractive index, $\beta$ is the phase constant of the waveguide, and $\lambda$ is the wavelength of the light propagating in the waveguide. In some embodiments, the effective refractive index is also called "modal index". In some embodiments, the effective refractive index depends on the whole waveguide design and its value can be obtained with numerical mode calculations by a mode solver software. For example, software "RP Fiber Power" or "RP Fiber Calculator" may be used to calculate the effective refractive indices of the waveguides.

Referring to FIG. 1A through FIG. 1C again, in some embodiments, the width W1 of the first strip portion 110 or the width W3 of the second strip portion 210 may be in a range from about 300 nm to about 500 nm. In some embodiments, the width W2 of the second end of the first tapered tip portion 120 or the width W4 of the second end of the tapered tip portion 220 may be in a range from about 10 nm to about 200 nm. In some embodiments, the length L1 of the first tapered tip portion 120 or the length L2 of the tapered tip portion 220 may be in a range from about few microns to about tens of microns. In some embodiments, the thickness T1 of the first waveguide 100 may be in a range from about 0.1 nm to about 5 nm. In some embodiments, the thickness T2 of the second waveguide 200 may be in a range from about 0.1 nm to about 5 nm.

In some embodiments, the width W2 of the second end of the first tapered tip portion 120 or the width W4 of the second end of the tapered tip portion 220 may be determined according to the refractive indices of the first waveguide 100 and the second waveguide 200. For example, in some embodiments, when the refractive index of the first waveguide 100 is greater than the refractive index of the second waveguide 200, the width W2 of the second end of the first tapered tip portion 120 is smaller than the width W4 of the second end of the second tapered tip portion 220 in order to match the effective refractive indices of the first waveguide 100 and the second waveguide 200 in the coupling region where the light 50 is coupled between the first waveguide 100 and the second waveguide 200. Similarly, in some alternative embodiments, when the refractive index of the first waveguide 100 is smaller than the refractive index of the second waveguide 200, the width W2 of the second end of the first tapered tip portion 120 is greater than the width W4 of the second end of the second tapered tip portion 220 in order to match the effective refractive indices of the first waveguide 100 and the second waveguide 200 in the coupling region where the light 50 is coupled between the first tapered tip portion 120 and the second tapered tip portion 220. In some yet alternative embodiments, when the refractive index of the first waveguide 100 is substantially equal to the refractive index of the second waveguide 200, the width W2 of the second end of the first tapered tip portion 120 is substantially equal to (or slightly greater or less than) the width W4 of the second end of the tapered tip portion 220.

For example, in an embodiment where the refractive indices of the first waveguide 100, the second waveguide 200 and the dielectric layer 300 are about 3.5, about 2.0 and about 1.4 respectively, the second end of the first tapered tip portion 120 may be designed to have the width W2 of about 0.11 μm, and the second end of the tapered tip portion 220 may be designed to have the width W4 of about 0.25 μm. In this case, the width W1 of the first strip portion 110 may be about 0.37 μm, the width W3 of the second strip portion 210 may be about 0.37 μm, the length L1 of the first tapered tip portion 120 may be about 9.32 μm, and the length of the tapered tip portion 220 may be about 19.82 μm, for example.

In addition, in some embodiments, when the refractive index of the first waveguide 100 is greater than the refractive index of the second waveguide 200, the thickness T1 (shown in FIG. 1C) of the first waveguide 100 is less than the thickness T2 (shown in FIG. 1C) of the second waveguide 200. Alternatively, when the refractive index of the first waveguide 100 is less than the refractive index of the second waveguide 200, the thickness of the first waveguide 100 is greater than the thickness of the second waveguide 200.

Figure 3A:
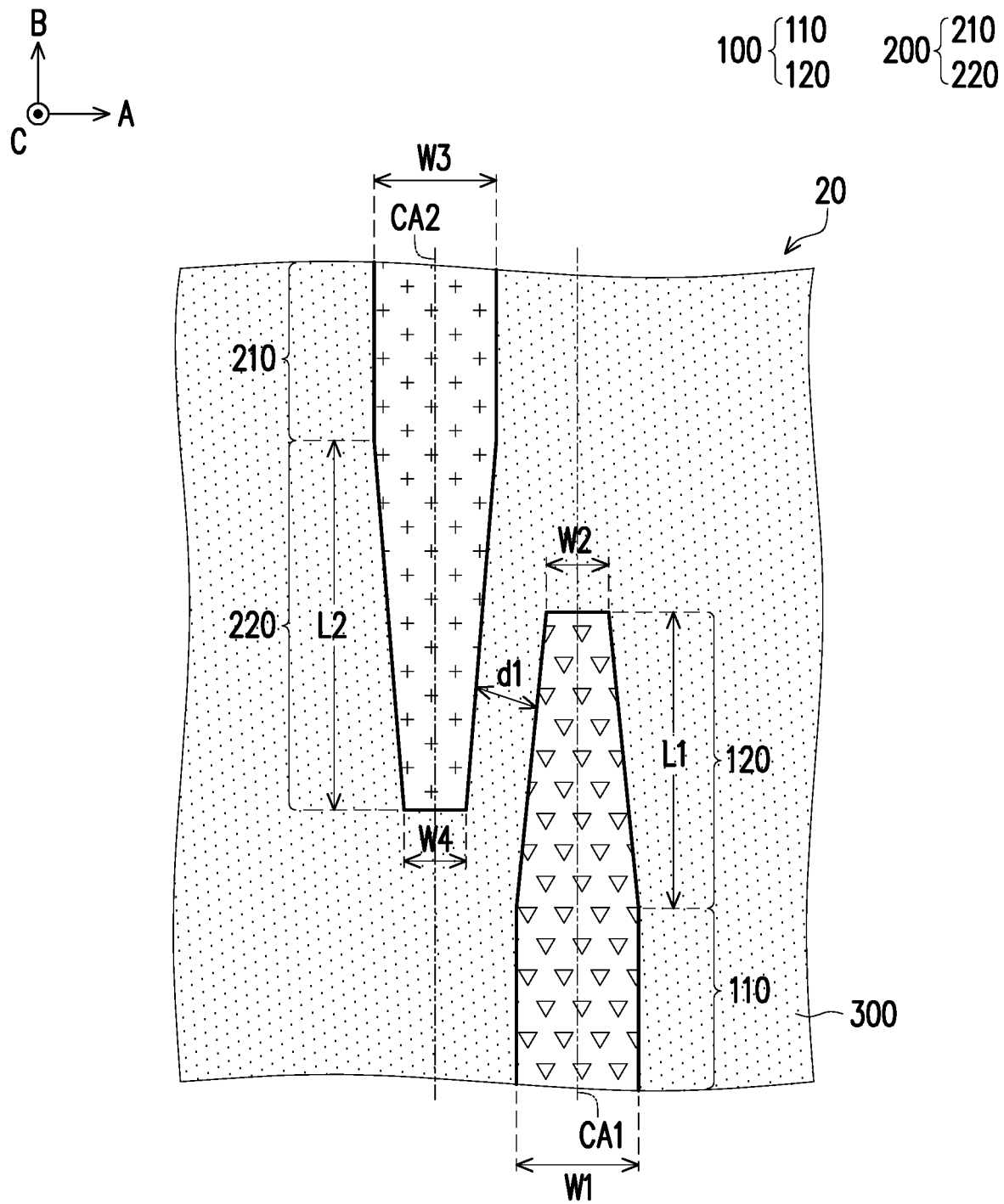
FIG. 3A schematically illustrates a top view of an optical waveguide coupler in accordance with some alternative embodiments.
Figure 3B:
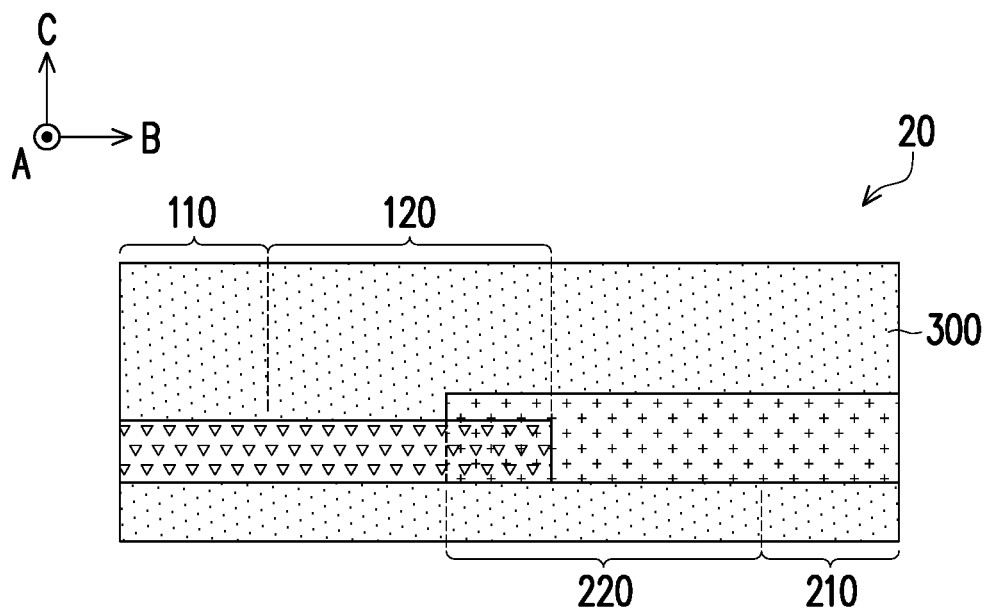
FIGS. 3B and 3C schematically illustrate side views of the optical waveguide coupler of FIG. 3A in accordance with some alternative embodiments.
Figure 3C:
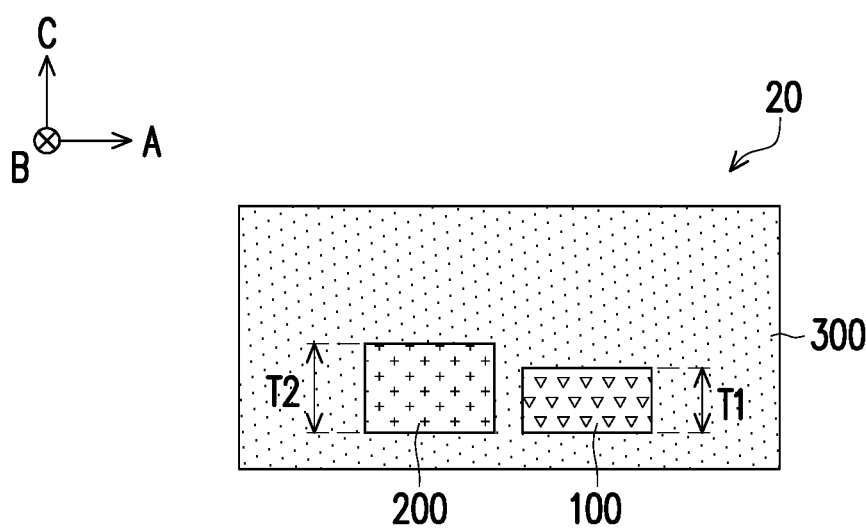

FIG. 3A schematically illustrates a top view of an optical waveguide coupler in accordance with some alternative embodiments. FIGS. 3B and 3C schematically illustrate side views of the optical waveguide coupler of FIG. 3A in accordance with some alternative embodiments. A 3D coordinate axis having mutually orthogonal A, B and C axes are provided for ease of description.

Referring to FIGS. 3A, 3B and 3C, an optical waveguide coupler 20 including a first waveguide 100 and a second waveguide 200 is shown. In particular, FIG. 3B shows the side view of the optical waveguide coupler 20 from A-direction and FIG. 3C shows the side view of the optical waveguide coupler 20 from B-direction. The optical waveguide coupler 20 in FIGS. 3A, 3B and 3C is similar to the optical waveguide coupler 10 in FIGS. 1A, 1B and 1C, except that the first waveguide 100 and the second waveguide 200 of the optical waveguide coupler 20 are disposed at a same level height, as shown in FIGS. 3B and 3C. In some embodiments, a bottom surface of the first waveguide 100 is substantially leveled with a bottom surface of the second waveguide 200. In some embodiments, the first tapered tip portion 120 of the first waveguide 100 is disposed aside the second tapered tip portion 220 of the second waveguide 200 in the A-direction. In some embodiments, the first tapered tip portion 120 of the first waveguide 100 from the top view is spaced apart from the second tapered tip portion 220 of the second waveguide 200 by the distance d1, as shown in FIG. 3A. In some embodiments, the first tapered tip portion 120 of the first waveguide 100 from the side view partially overlaps with the second tapered tip portion 220 of the second waveguide 200, as shown in FIG. 3B. In other words, a projection of the first tapered tip portion 120 along the A-direction partially overlaps with the second tapered tip portion 220. In some embodiments, the first strip portion 110 of the first waveguide 100 from the side view does not overlap with the second strip portion 210 of the second waveguide 200, as shown in FIG. 3B. In other words, a projection of the first strip portion 110 along the A-direction does not overlap with and is separated from the second strip portion 210.

Figure 4A:
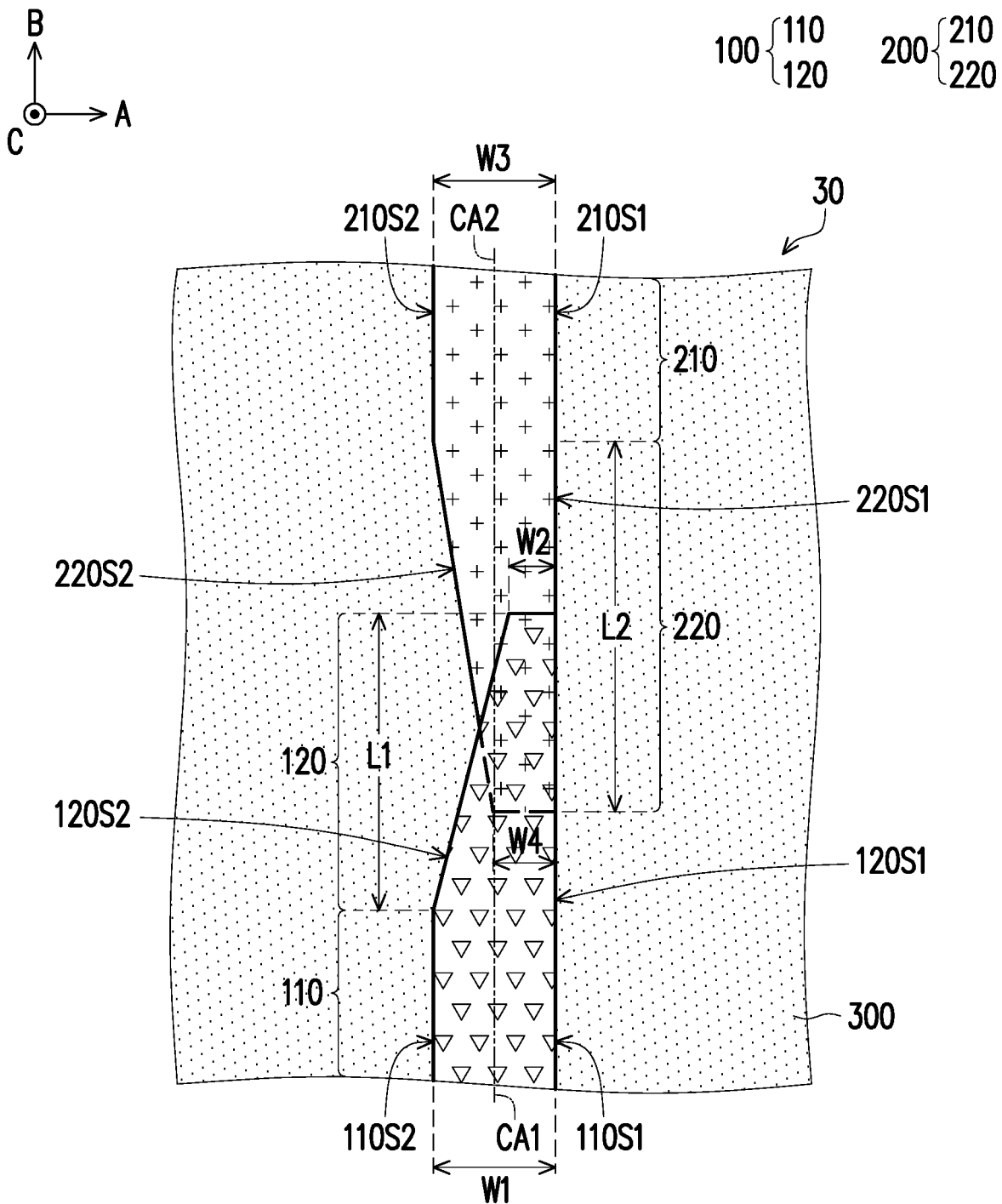
FIG. 4A schematically illustrates a top view of an optical waveguide coupler in accordance with some alternative embodiments.
Figure 4B:
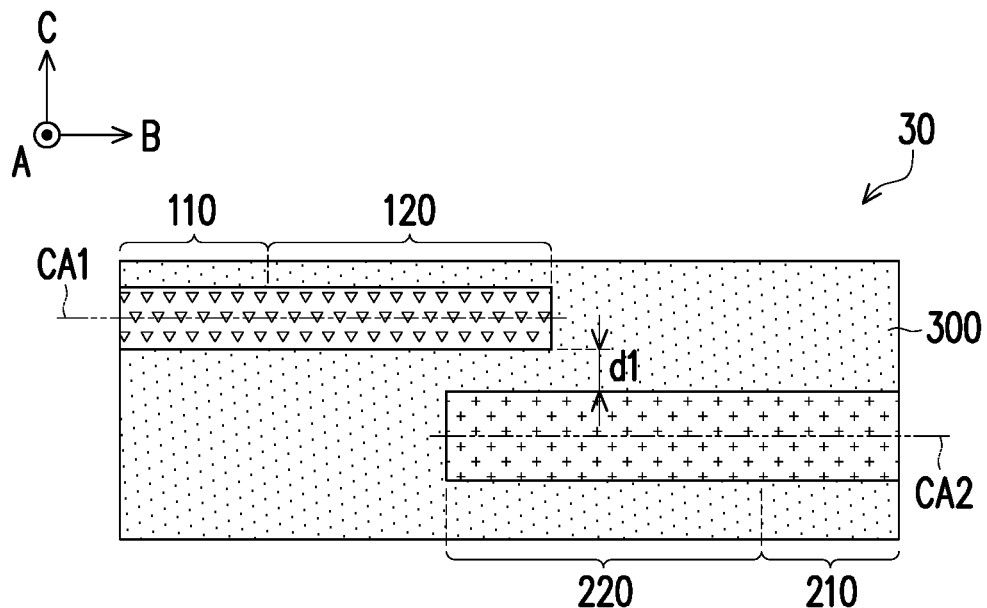
FIGS. 4B and 4C schematically illustrate side views of the optical waveguide coupler of FIG. 4A in accordance with some alternative embodiments.
Figure 4C:
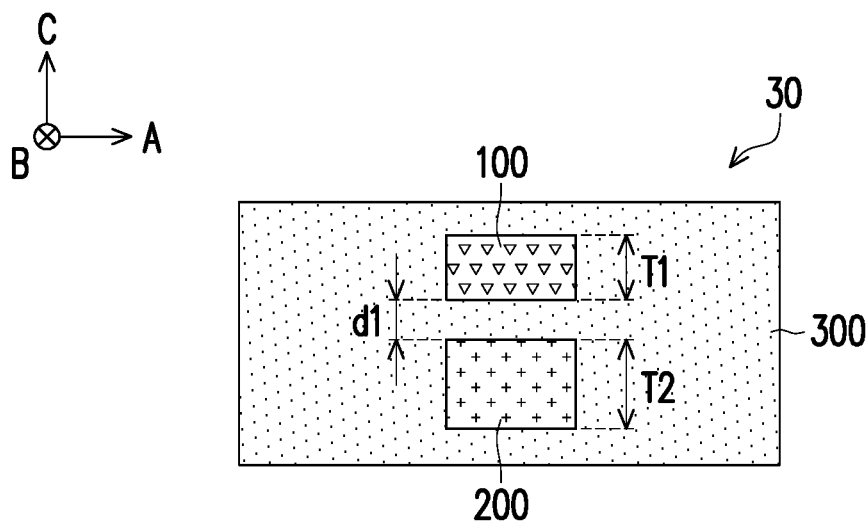

FIG. 4A schematically illustrates a top view of an optical waveguide coupler in accordance with some alternative embodiments. FIGS. 4B and 4C schematically illustrate side views of the optical waveguide coupler of FIG. 4A in accordance with some embodiments. A 3D coordinate axis having mutually orthogonal A, B and C axes are provided for ease of description.

Referring to FIGS. 4A, 4B and 4C, an optical waveguide coupler 30 including a first waveguide 100 and a second waveguide 200 is shown. In particular, FIG. 4B shows the side view of the optical waveguide coupler 30 from A-direction and FIG. 4C shows the side view of the optical waveguide coupler 30 from B-direction. The optical waveguide coupler 30 in FIGS. 4A, 4B and 4C is similar to the optical waveguide coupler 10 in FIGS. 1A, 1B and 1C, except that the first tapered tip portion 120 of the optical waveguide coupler 30 from the top view is not symmetrical relative to the central axis CA1 of the first strip portion 110, and the second tapered tip portion 220 of the optical waveguide coupler 30 from the top view is not symmetrical relative to the central axis CA2 of the second strip portion 210. In some embodiments, the first sidewall 120S1 of the first tapered tip portion 120 is parallel to the central axis CA1 of the first strip portion 110, and is parallel to the first surface 110S1 of the first strip portion 110. In some embodiments, the second sidewall 120S2 of the first tapered tip portion 120 is inclined with respect to the central axis CA1 of the first strip portion 110. In some embodiments, the first sidewall 220S1 of the second tapered tip portion 220 is parallel to the central axis CA2 of the second strip portion 210, and is parallel to the first surface 210S1 of the second strip portion 210. In some embodiments, the second sidewall 220S2 of the second tapered tip portion 220 is inclined with respect to the central axis CA2 of the second strip portion 210. In some embodiments, the first sidewall 120S1 of the first tapered tip portion 120 is substantially aligned with the first sidewall 220S1 of the second tapered tip portion 220 in the C-direction.

Figure 5A:
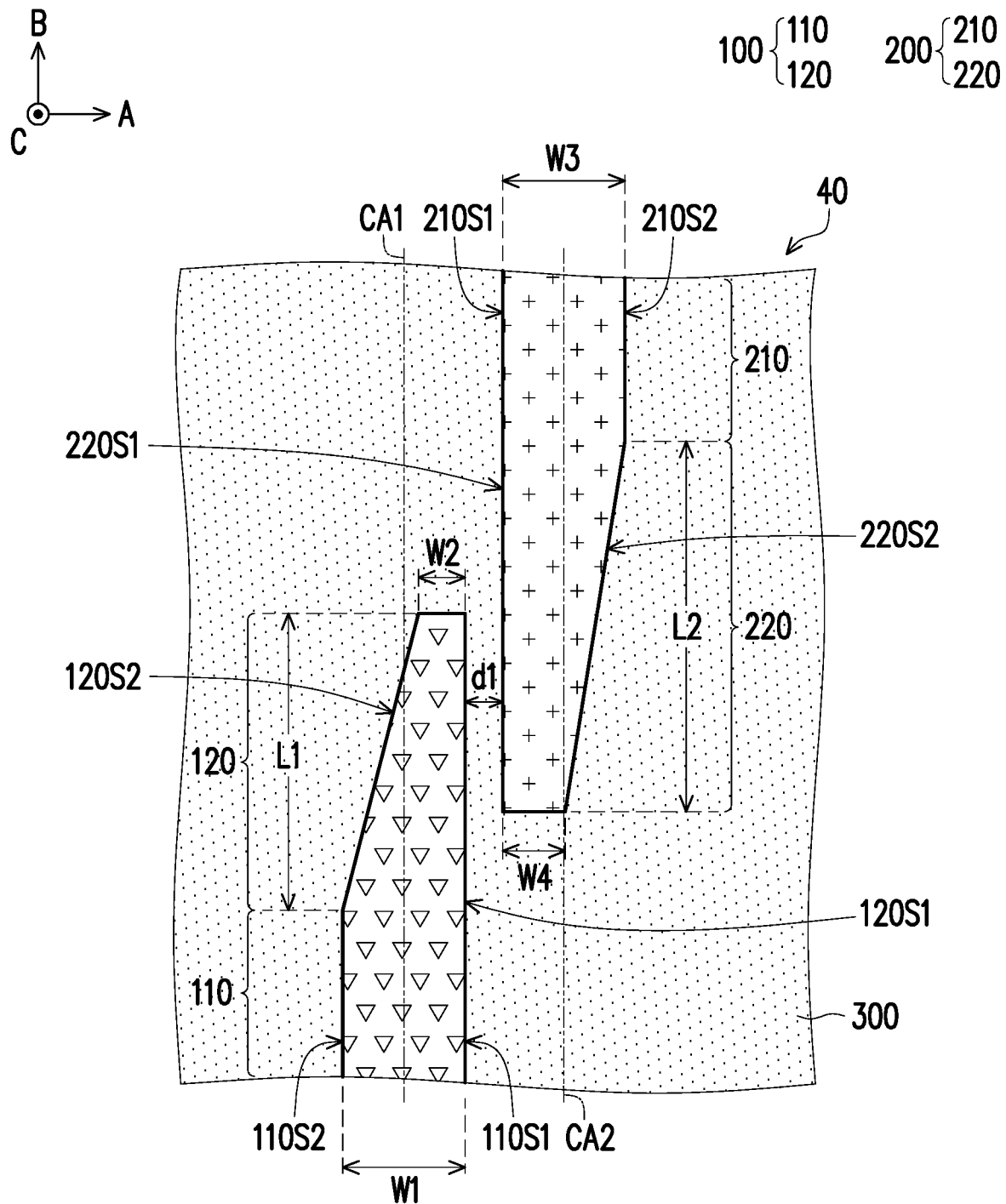
FIG. 5A schematically illustrates a top view of an optical waveguide coupler in accordance with some alternative embodiments.
Figure 5B:
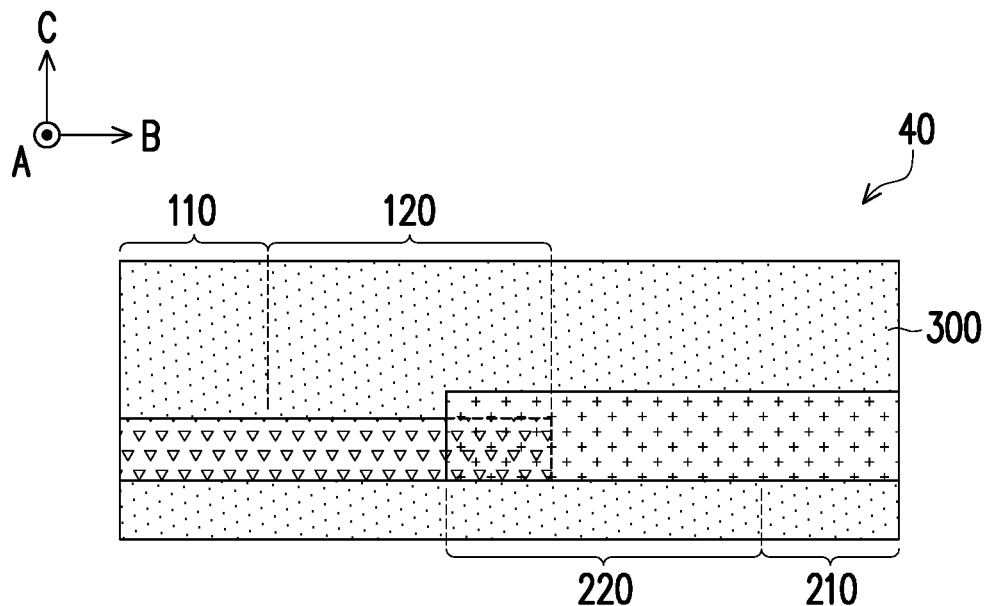
FIGS. 5B and 5C schematically illustrate side views of the optical waveguide coupler of FIG. 5A in accordance with some alternative embodiments.
Figure 5C:
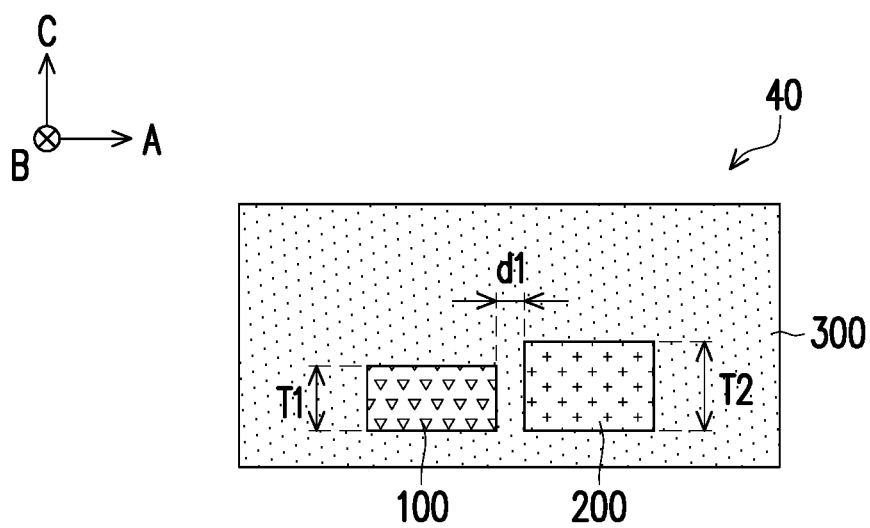

FIG. 5A schematically illustrates a top view of an optical waveguide coupler in accordance with some alternative embodiments. FIGS. 5B and 5C schematically illustrate side views of the optical waveguide coupler of FIG. 5A in accordance with some alternative embodiments. A 3D coordinate axis having mutually orthogonal A, B and C axes are provided for ease of description.

Referring to FIGS. 5A, 5B and 5C, an optical waveguide coupler 40 including a first waveguide 100 and a second waveguide 200 is shown. In particular, FIG. 5B shows the side view of the optical waveguide coupler 40 from A-direction and FIG. 5C shows the side view of the optical waveguide coupler 40 from B-direction. The optical waveguide coupler 40 in FIGS. 5A, 5B and 5C is similar to the optical waveguide coupler 30 in FIGS. 4A, 4B and 4C, except that the first waveguide 100 and the second waveguide 200 of the optical waveguide coupler 40 are disposed at a same level height, as shown in FIGS. 5B and 5C. In some embodiments, a bottom surface of the first waveguide 100 is substantially leveled with a bottom surface of the second waveguide 200. In some embodiments, the first tapered tip portion 120 of the first waveguide 100 is disposed aside the second tapered tip portion 220 of the second waveguide 200 in the A-direction. In some embodiments, the first tapered tip portion 120 of the first waveguide 100 from the top view is spaced apart from the second tapered tip portion 220 of the second waveguide 200 by the distance d1, as shown in FIG. 5A. In some embodiments, the first tapered tip portion 120 of the first waveguide 100 from the side view partially overlaps with the second tapered tip portion 220 of the second waveguide 200, as shown in FIG. 5B. In other words, a projection of the first tapered tip portion 120 along the A-direction partially overlaps with the second tapered tip portion 220. In some embodiments, the first strip portion 110 of the first waveguide 100 from the side view does not overlap with the second strip portion 210 of the second waveguide 200, as shown in FIG. 5B. In other words, a projection of the first strip portion 110 along the A-direction does not overlap with and is separated from the second strip portion 210.

In some embodiments, the first sidewall 120S1 of the first tapered tip portion 120 (which is parallel to the central axis CA1 of the first strip portion 110) faces the second tapered tip portion 210, and the second sidewall 120S2 of the first tapered tip portion 120 (which is inclined with respect to the central axis CA1 of the first strip portion 110) faces away from the second tapered tip portion 210. In some embodiments, the first sidewall 220S1 of the second tapered tip portion 220 (which is parallel to the central axis CA2 of the second strip portion 210) faces the first tapered tip portion 110, and the second sidewall 220S2 of the second tapered tip portion 220 (which is inclined with respect to the central axis CA2 of the second strip portion 210) faces away from the first tapered tip portion 110. In other words, the first sidewall 120S1 of the first tapered tip portion 120 faces the first sidewall 220S1 of the second tapered tip portion 220.

Figure 6:
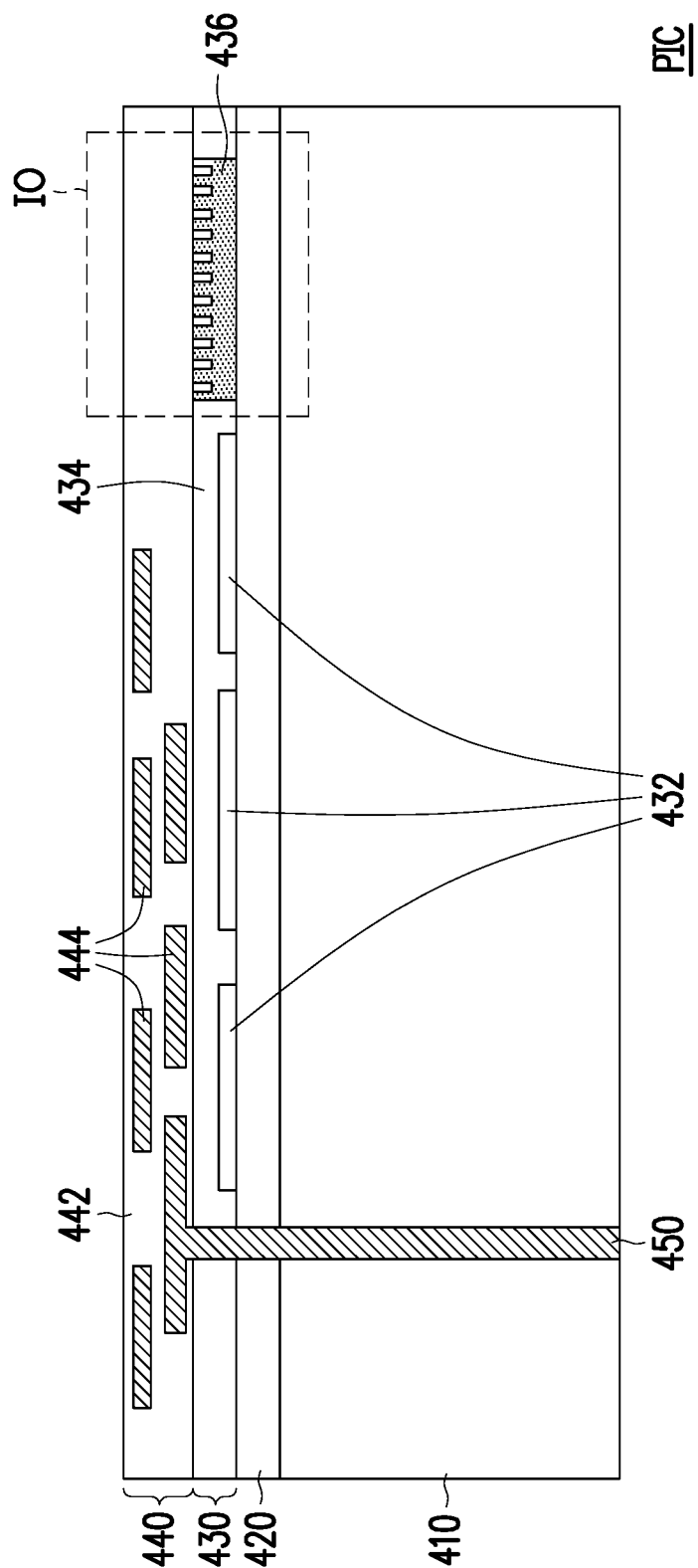
FIG. 6 schematically illustrates a cross-sectional view of a photoelectric integrated circuit (IC) die in accordance with some embodiments.

FIG. 6 schematically illustrates a cross-sectional view of a photoelectric integrated circuit (IC) die in accordance with some embodiments. Referring to FIG. 6, a photoelectric IC die PIC is shown. In some embodiments, the photoelectric IC die PIC includes a semiconductor substrate 410, a dielectric layer 420, a device layer 430 and an interconnect layer 440. In some embodiments, the semiconductor substrate 410 may be or may include a bulk silicon substrate, a silicon germanium substrate, or a substrate formed of other semiconductor materials. In some embodiments, the dielectric layer 420 is formed over the semiconductor substrate 410, and a material of the dielectric layer 420 may include silicon oxide or other suitable dielectric materials. In some embodiments, the device layer 430 is formed over the dielectric layer 420, and includes waveguides 432 and a dielectric layer 434 to cover the waveguides 432. In some embodiments, the semiconductor substrate 410, the dielectric layer 420 and the device layer 430 form a SOI (Silicon on Insulator) structure. In some embodiments, the interconnect layer 440 is disposed over the device layer 430, and includes a dielectric layer 442 and interconnect wirings 444 embedded in the dielectric layer 442. In some embodiments, the photoelectric IC die PIC includes a through semiconductor via (TSV) 450 electrically connected to the interconnect structure 440 and extending downward into the semiconductor substrate 410. In some embodiments, the TSV 450 may be formed in the semiconductor substrate 410, the dielectric layer 420, the device layer 430 and the interconnect structure 440. In some embodiments, a material of the dielectric layer 434 and/or the dielectric layer 442 may include silicon oxide, silicon nitride, silicon oxynitirde or other suitable dielectric materials. In some embodiments, the interconnect wirings 444 and/or the TSVs 550 may be formed of copper, copper alloys or other suitable conductive material.

In some embodiments, the photoelectric IC die PIC includes at least one optical input/output terminal IO configured to receive/transmit an optical signal from/to an optical fiber (not shown), such that the photoelectric IC die PIC is able to optically communicate with external device. The optical signal is, for example, pulsed light, light with continuous wave (CW) or the combinations thereof. In some embodiments, the optical input/output terminal IO includes a grating coupler 436 embedded in the dielectric layer 434 of the device layer 430. In some embodiments, the grating coupler 436 is optically coupled to at least one waveguide 432.

In some embodiments, the waveguides 432 are configured to deliver light between different devices (not shown), such as photoelectric devices or optical devices, over the semiconductor substrate 410. In some embodiments, the devices may include a light source (e.g., laser diode), a photodetector (e.g., photo diode), an optical modulator, and/or a grating coupler. For example, the waveguides 432 may be used to deliver a light from the light source to the photodetector. When the photodetector receives or detects the light from the waveguides 432, the light is converted into photo-current by the photodetector, such that the optical signal is converted into the electrical signal. Or, the waveguides 432 may be used to deliver a light from the light source to the optical modulator, and the optical modulator may manipulate a property of light, such as polarization, phase and/or intensity. In some embodiments, some of the waveguides 432 are disposed at the same level height. In some embodiments, some of the waveguides 432 are disposed at different level heights. In some embodiments, the photoelectric IC die PIC further includes other devices and circuits (not shown) that may be used for processing and transmitting optical signals and/or electrical signals.

In some embodiments, a single waveguide 432 is used to transmit light between two aforementioned devices. In some embodiments, two or more waveguides 432 are used to transmit light between two aforementioned devices due to, for example, layout design. In this case, the first waveguide 100 and the second waveguide 200 of the aforementioned optical waveguide coupler 10, 20, 30 or 40 may be used to serve as the waveguides 432 for lower optical loss. That is to say, the first waveguide 100 and the second waveguide 200 of the optical waveguide coupler 10, 20, 30 or 40 may be used to transmit light between two aforementioned devices.

In view of the above, in some embodiments of the disclosure, by the design of the first and second tapered tip portions, the light (mode) may be coupled between the first and second waveguides with high efficiency, such that lower optical loss is achieved.

In accordance with some embodiments of the disclosure, a structure includes a first waveguide and a second waveguide. The first waveguide includes a first strip portion and a first tapered tip portion connected to the first strip portion. The second waveguide includes a second strip portion and a second tapered tip portion connected to the second strip portion, wherein the first tapered tip portion of the first waveguide is optically coupled to the second tapered tip portion of the second waveguide, and the first waveguide and the second waveguide are configured to guide a light. In a region where the light is coupled between the first tapered tip portion and the second tapered tip portion, an effective refractive index of the first waveguide with respect to the light is substantially equal to an effective refractive index of the second waveguide with respect to the light.

In accordance with some embodiments of the disclosure, a structure includes a first waveguide and a second waveguide. The first waveguide includes a first strip portion and a first tapered tip portion connected to the first strip portion, wherein the first tapered tip portion has a first end connected to the first strip portion and a second end opposite to the first end of the first tapered tip portion, and a width of the first end of the first tapered tip portion is greater than a width of the second end of the first tapered tip portion. The second waveguide includes a second strip portion and a second tapered tip portion connected to the second strip portion, wherein the second tapered tip portion has a first end connected to the second strip portion and a second end opposite to the first end of the second tapered tip portion, and a width of the first end of the second tapered tip portion is greater than a width of the second end of the second tapered tip portion, and the first tip portion is adjacent to the second tip portion. A refractive index of the first waveguide is greater than a refractive index of the second waveguide, and the width of the second end of the first tapered tip portion is smaller than the width of the second end of the second tapered tip portion.

In accordance with some embodiments of the disclosure, a photoelectric integrated circuit (IC) die includes a substrate, a photoelectric device, a first waveguide and a second waveguide. The photoelectric device is disposed over the substrate. The first waveguide is disposed over the substrate and includes a first strip portion and a first tapered tip portion, wherein the first strip portion is connected between the optical device and the first tapered tip portion. The second waveguide is disposed over the substrate and includes a second strip portion and a second tapered tip portion connected to the second strip portion, wherein the second tapered tip portion of the second waveguide is optically coupled to the first tapered tip portion of the first waveguide, the second tapered tip portion of the second waveguide is separated from the first tapered tip portion of the first waveguide by a distance, and a center axis of the first strip portion of the first waveguide is offset from a center axis of the second strip portion of the second waveguide. The first tapered tip portion has a first sidewall and a second sidewall opposite to the first sidewall, the first sidewall of the first tapered tip portion is parallel to the center axis of the first strip portion, and the second sidewall of the first tapered tip portion is inclined with respect to the center axis of the first strip portion.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A structure, comprising:
   a semiconductor substrate;
   a device layer disposed over the semiconductor substrate;
   an interconnect structure disposed on the device layer, the device layer comprising an optical waveguide coupler, and the optical waveguide coupler comprising:
   a first waveguide, comprising a first strip portion and a first tapered tip portion connected to the first strip portion; and
   a second waveguide, comprising a second strip portion and a second tapered tip portion connected to the second strip portion, wherein the first tapered tip portion of the first waveguide is optically coupled to the second tapered tip portion of the second waveguide, and the first waveguide and the second waveguide are configured to guide a light, and
   wherein the first tapered tip portion is adjacent to the second tapered tip portion, a refractive index of the first tapered tip portion is greater than a refractive index of the second tapered tip portion, and the width of the second end of the first tapered tip portion is smaller than the width of the second end of the second tapered tip portion.

2. The structure as claimed in claim 1, wherein the first tapered tip portion is spaced apart from the second tapered tip portion by a distance.

3. The structure as claimed in claim 1, wherein the first waveguide and the second waveguide are made of different materials.

4. The structure as claimed in claim 3, wherein a width of an end of the first tapered tip portion farther away from the first strip portion is less than that of an end of the second tapered tip portion farther away from the second strip portion.

5. The structure as claimed in claim 1, wherein the first waveguide and the second waveguide are made of a same material.

6. The structure as claimed in claim 5, wherein a width of an end of the first tapered tip portion farther away from the first strip portion is substantially equal to that of an end of the second tapered tip portion farther away from the second strip portion.

7. The structure as claimed in claim 1, wherein the first waveguide and the second waveguide are embedded in a dielectric layer having a refractive index lower than those of the first waveguide and the second waveguide, and the dielectric layer entirely covers as well as is in contact with a top surface of the semiconductor substrate.

8. The structure as claimed in claim 1, wherein the first waveguide and the second waveguide are disposed at a same level height.

9. The structure as claimed in claim 1, wherein the first waveguide and the second waveguide are disposed at different level heights.

10. A structure, comprising: a first waveguide, comprising a first strip portion and a first tapered tip portion connected to the first strip portion, wherein the first tapered tip portion has a first end connected to the first strip portion and a second end opposite to the first end of the first tapered tip portion, and a width of the first end of the first tapered tip portion is greater than a width of the second end of the first tapered tip portion; and a second waveguide, comprising a second strip portion and a second tapered tip portion connected to the second strip portion, wherein the second tapered tip portion has a first end connected to the second strip portion and a second end opposite to the first end of the second tapered tip portion, and a width of the first end of the second tapered tip portion is greater than a width of the second end of the second tapered tip portion, and the first tapered tip portion is adjacent to the second tapered tip portion, and wherein a refractive index of the first waveguide is greater than a refractive index of the second waveguide, and the width of the second end of the first tapered tip portion is smaller than the width of the second end of the second tapered tip portion; and
   a center axis of the first strip portion of the first waveguide is offset from a center axis of the second strip portion of the second waveguide; wherein the first tapered tip portion has a first sidewall and a second sidewall opposite to the first sidewall, the first sidewall of the first tapered tip portion is parallel to the center axis of the first strip portion, and the second sidewall of the first tapered tip portion is inclined with respect to the center axis of the first strip portion.

11. The structure as claimed in claim 10, wherein the first tapered tip portion is spaced apart from the second tapered tip portion by a distance.

12. The structure as claimed in claim 10, wherein the first waveguide and the second waveguide are disposed at a same level height, the first waveguide and the second waveguide extend along a first direction, and a projection of the first strip portion along a second direction perpendicular to the first direction does not overlap with the second strip portion.

13. The structure as claimed in claim 10, wherein a thickness of the first waveguide is smaller than a thickness of the second waveguide.

14. The structure as claimed in claim 10, wherein the first waveguide and the second waveguide are disposed at a same level height, the first waveguide and the second waveguide extend along a first direction, and a projection of the first tapered tip portion along a second direction perpendicular to the first direction partially overlaps with the second tapered tip portion.

15. The structure as claimed in claim 10, wherein the first waveguide and the second waveguide are disposed at different level heights, the first waveguide and the second waveguide extend along a first direction, and a projection of the first tapered tip portion along a second direction perpendicular to the first direction partially overlaps with the second tapered tip portion.

16. A photoelectric integrated circuit (IC) die, comprising:
   a semiconductor substrate;
   a first dielectric layer disposed on the semiconductor substrate;
   a device layer disposed on the dielectric layer, the device layer comprising;
   a first waveguide, disposed over the first dielectric layer and comprising a first strip portion and a first tapered tip portion, wherein the first strip portion is connected between the optical device and the first tapered tip portion; and
   a second waveguide, disposed over the first dielectric layer and comprising a second strip portion and a second tapered tip portion connected to the second strip portion, wherein the second tapered tip portion of the second waveguide is optically coupled to the first tapered tip portion of the first waveguide, the second tapered tip portion of the second waveguide is separated from the first tapered tip portion of the first waveguide by a distance, and a center axis of the first strip portion of the first waveguide is offset from a center axis of the second strip portion of the second waveguide, and a second dielectric layer disposed on the first dielectric layer to cover the first waveguide and the second waveguide, wherein sidewalls of the first dielectric layer and sidewalls of the second dielectric layer are substantially aligned with sidewalls of the semiconductor substrate;

wherein the first tapered tip portion has a first sidewall and a second sidewall opposite to the first sidewall, the first sidewall of the first tapered tip portion is parallel to the center axis of the first strip portion, and the second sidewall of the first tapered tip portion is inclined with respect to the center axis of the first strip portion.

17. The photoelectric IC die as claimed in claim 16, wherein the first waveguide and the second waveguide are disposed at a same level height, the first waveguide and the second waveguide extend along a first direction, and a projection of the first tapered tip portion along a second direction perpendicular to the first direction partially overlaps with the second tapered tip portion.

18. The photoelectric IC die as claimed in claim 16, wherein the first waveguide and the second waveguide are disposed at different level heights, the first waveguide and the second waveguide extend along a first direction, and a projection of the first tapered tip portion along a second direction perpendicular to the first direction partially overlaps with the second tapered tip portion.

19. The photoelectric IC die as claimed in claim 16, wherein the first waveguide and the second waveguide are made of different materials.

20. The photoelectric IC die as claimed in claim 16, wherein the first waveguide and the second waveguide have different thickness.

\* \* \* \* \*